United States Patent
Indurkar et al.

(10) Patent No.: US 10,798,574 B1
(45) Date of Patent: Oct. 6, 2020

(54) MOBILE COMMUNICATION DEVICE CERTIFICATION FRAMEWORK

(71) Applicant: Sprint Communications Company L.P., Overland Park, KS (US)

(72) Inventors: Dhananjay Indurkar, Overland Park, KS (US); Mark D. Peden, Paola, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 58 days.

(21) Appl. No.: 16/274,428

(22) Filed: Feb. 13, 2019

(51) Int. Cl.
  *H04W 4/00* (2018.01)
  *H04W 12/06* (2009.01)
  *H04W 8/24* (2009.01)
  *H04L 29/06* (2006.01)
  *H04W 12/00* (2009.01)
  *H04W 12/08* (2009.01)

(52) U.S. Cl.
  CPC ..... *H04W 12/0609* (2019.01); *H04L 63/0876* (2013.01); *H04W 8/24* (2013.01); *H04W 12/0023* (2019.01); *H04W 12/08* (2013.01)

(58) Field of Classification Search
  None
  See application file for complete search history.

(56) References Cited

U.S. PATENT DOCUMENTS

| | | | | |
|---|---|---|---|---|
| 8,200,794 B1 * | 6/2012 | Sutherland | .......... | H04L 63/0209 709/222 |
| 8,646,060 B1 * | 2/2014 | Ben Ayed | .......... | H04L 63/0853 726/9 |
| 9,779,603 B1 * | 10/2017 | Subramanian | ........ | H04L 63/102 |
| 10,251,064 B1 * | 4/2019 | Indurkar | ................ | H04W 84/12 |
| 2011/0093703 A1 * | 4/2011 | Etchegoyen | ............ | G06F 21/57 713/168 |
| 2013/0159191 A1 * | 6/2013 | Maiya | .................... | G06Q 40/02 705/44 |
| 2014/0213238 A1 * | 7/2014 | Giraud | .................... | H04W 4/80 455/418 |
| 2015/0341456 A1 * | 11/2015 | Chiu | ................. | H04M 1/72577 709/219 |
| 2016/0182490 A1 * | 6/2016 | Gupta | .................... | G06F 21/62 713/171 |
| 2019/0066114 A1 * | 2/2019 | Ross | ................. | G06Q 20/3224 |

\* cited by examiner

*Primary Examiner* — Gerald A Smarth

(57) ABSTRACT

A mobile communication device certification system is disclosed comprising a mobile communication device including a device client that detects and transmits device side events to a certification application. The system also comprises one or more servers comprising a network client and the certification application. The network client detects and transmits network side events associated with the mobile communication device to the certification application. The certification application receives and analyzes the device and network side events, corroborates at least one device side event based on at least one network side event, determines and stores mobile device events in a data store based on the analysis and corroboration, receives an unlock request after resale of the mobile communication device, accesses one or more of the mobile device events responsive to the unlock request, and sends an unlock command to the mobile communication device based on the accessed mobile device event(s).

20 Claims, 9 Drawing Sheets

MOBILE COMMUNICATION DEVICE CERTIFICATION FRAMEWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A mobile communication device encounters a plurality of different lifecycle events during its lifetime. For example, at the beginning of its lifetime, the mobile communication device encounters a provisioning lifecycle event and at the end of its lifetime, the mobile communication device encounters a decommissioning or recycling lifecycle event. There are numerous other events that occur during the lifetime of the mobile communication device.

SUMMARY

In an embodiment, a mobile communication device certification system is disclosed. The mobile communication device certification system comprises a mobile communication device that comprises a device client stored in a non-transitory memory of the mobile communication device, that when executed by a processor of the mobile communication, detects a plurality of device side events associated with the mobile communication device and transmits the plurality of device side events to a certification application. The mobile communication device certification system also comprises one or more servers that comprise a network client and the certification application. The network client is stored in a non-transitory memory of one of the one or more servers, that when executed by a processor of one of the one or more servers detects a plurality of network side events associated with the mobile communication device and transmits the plurality of network side events to the certification application. The certification application is stored in a non-transitory memory of one of the one or more servers, that when executed by a processor of one of the one or more servers, receives the plurality of device side events from the device client and the plurality of network side events from the network client, analyzes the plurality of device side events and the plurality of network side events, corroborates at least one of the plurality of device side events based on at least one of the plurality of network side events, determines a plurality of mobile device events for the mobile communication device based on the analysis and the corroboration, stores the plurality of mobile device events in a data store, receives an unlock request after resale of the mobile communication device, accesses one or more of the plurality of mobile device events in the data store in response to the unlock request, and sends an unlock command to the mobile communication device to unlock the mobile communication device based on the one or more accessed mobile device events.

In another embodiment, a method for certifying one or more mobile communication devices is disclosed. The method comprises detecting, by a device client stored on a non-transitory memory of a mobile communication device and executed by a processor of the mobile communication device, a plurality of device side events associated with the mobile communication device and transmitting, by the device client, the plurality of device side events to a certification application stored in a non-transitory memory of a certification server and executed by a processor of the certification server. The method also comprises detecting, by a network client stored on a non-transitory memory of a telecommunications service provider server and executed by a processor of the telecommunications service provider server, a plurality of network side events associated with the mobile communication device and transmitting, by the network client, the plurality of network side events to the certification application. The method additionally comprises receiving, by the certification application, the plurality of device side events from the device client and the plurality of network side events from the network client, analyzing, by the certification application, the plurality of device side events and the plurality of network side events, corroborating, by the certification application, at least one of the plurality of device side events based on at least one of the plurality of network side events, determining, by the certification application, a plurality of mobile device events for the mobile communication device based on the analysis and the corroboration, and storing, by the certification application, the plurality of mobile device events in a data store. The method further comprises receiving, by the certification application, an unlock request after resale of the mobile communication device, accessing, by the certification application, one or more of the plurality of mobile device events in the data store in response to the unlock request, and sending, by the certification application, an unlock command to the mobile communication device to unlock the mobile communication device based on the one or more accessed mobile device events.

In yet another embodiment, a method for certifying one or more mobile communication devices is disclosed. Each step in the method is performed by a certification application stored in a non-transitory memory of a certification server and executed by a processor of the certification server. The method comprises receiving a first plurality of device side events associated with a mobile communication device from a device client executing on the mobile communication device and a first plurality of network side events associated with the mobile communication device from a network client executing on a telecommunications service provider server. The method also comprises analyzing the first plurality of device side events and the first plurality of network side events, corroborating at least one of the first plurality of device side events based on at least one of the first plurality of network side events, determining a plurality of mobile device events for the mobile communication device based on the analysis and the corroboration, storing the plurality of mobile device events for the mobile communication device in a data store, and subsequently receiving a device recycle event for the mobile communication device and storing the device recycle event in the data store. The device recycle event is associated with a unique device identifier of the mobile communication device. The method additionally comprises after storing the device recycle event, receiving a second plurality of device side events associated with the mobile communication device from the device client and a second plurality of network side events associated with the mobile communication device from a second network client executing on a second telecommunications service provider server. At least one of the second plurality of device side events or the second plurality of network side events comprises the unique device identifier. The method further comprises searching the data store for the unique identifier to determine whether the unique device identifier is associated with any device recycle events, determining that the unique device identifier is associated with the device recycle event based on the searching, and sending a lock command to the mobile communication device to lock the mobile communication device based on determining that the unique device identifier is associated with the device recycle event.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
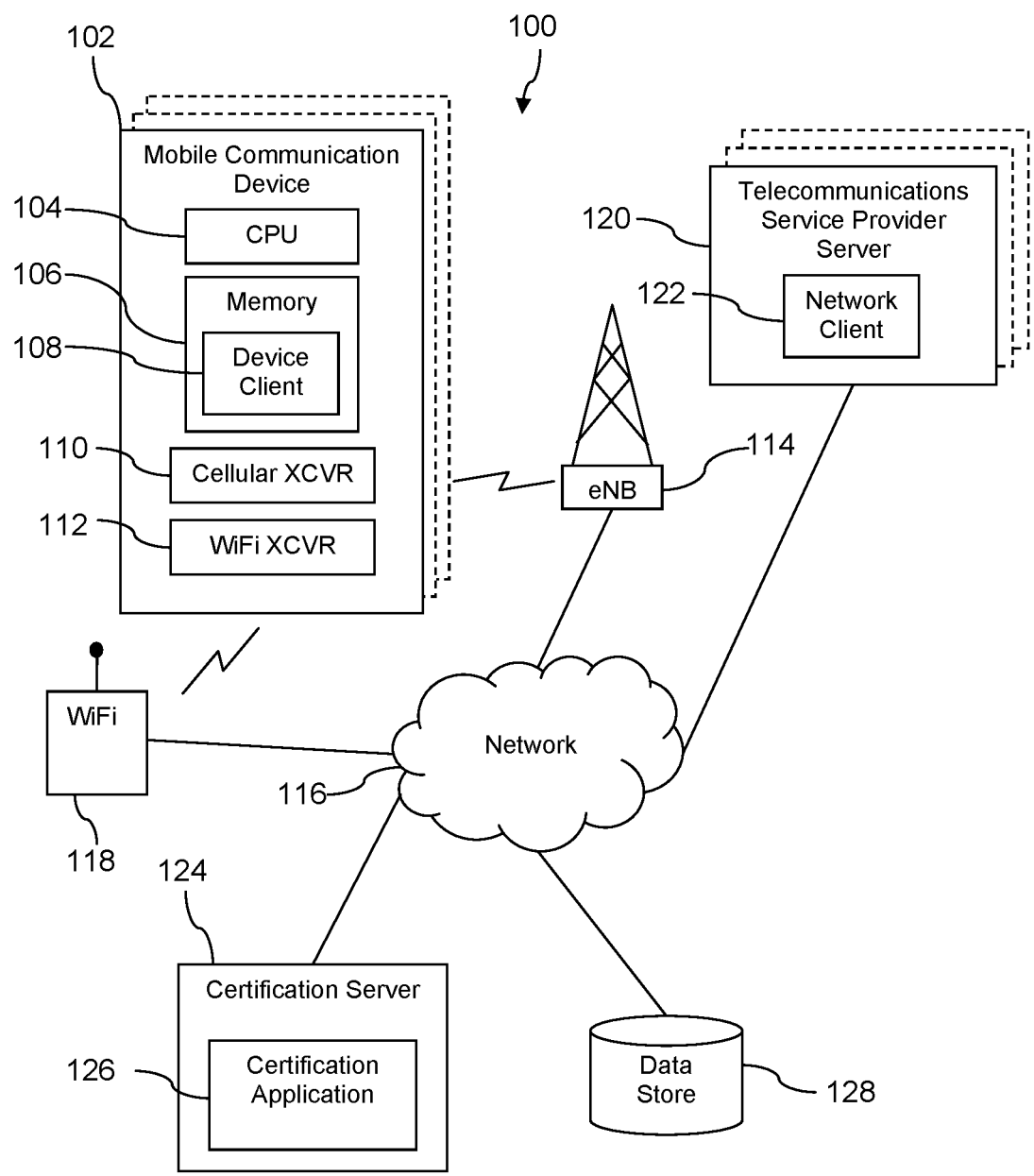
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Reselling of mobile phones is becoming more common place as network operators turn more to leased mobile phones which are returned to the network operators at the end of the leasing period. However, reselling of mobile communication devices (e.g., mobile phones) may be difficult in some circumstances due to buyer resistance to buying an unknown commodity and possibly previous experience of buying a resold phone that had difficulty activating. Providing a trustworthy, authoritative device history to potential buyers of resold mobile communication devices would help to increase sales.

Thus, the pending application is directed to a mobile communication device certification framework. The mobile communication device certification framework comprises a device client on a mobile communication device that detects and transmits device side events, a network client on a telecommunications service provider server that detects and transmits network side events, and a certification application on a certification server that receives and analyzes the device side events and the network side events. The certification application may create a phone history that comprises mobile device events in the lifecycle of the mobile device based on the analyzed device side events and the network side events and may track transferal of ownership of the mobile communication device over time based on the mobile device events.

The certification server may offer an application programming interface (API) for various authorized entities to append records to the phone history stored in a data store. For example, an original equipment manufacturer (OEM) may provide a first record at the time of generating a sales/ship manifest including the subject mobile communication device.

On the device side, the device client may detect device side events such a power on event, a reset event, an activation event, a device component change event, a repair event, a device identifier change event, and/or another type of device side event. On the network side, the network client may detect network side events such as a provisioning event, a carrier unlock event, a carrier lock event, a lost or stolen event, a device found event, a device return event, a device refurbished event, a device recycled event, and/or another type of network side event. The certification application may corroborate one or more of the device side events based on one or more of the network side events. Corroborating one or more device side events based on one or more of the network side events may reduce the chances of fraud on the part of the device client.

The certification application may determine mobile device events for the mobile communication device based on the analysis and the corroboration. Some of the mobile device events may be identical or substantially similar to the received device side and/or network side events. Some of the mobile device events may be determined based on inferences from the received device side and/or network side events.

Other information may also be stored in the data store as associated with the mobile communication device along with the mobile device events. For example, the device client may monitor performance of the mobile communication device and transmit mobile device performance information to the certification application. As another example, the device client may determine and transmit mobile device capabilities of the mobile communication device to the certification application.

The mobile device events, mobile device performance information, and/or the mobile device capabilities stored in the data store as associated with the mobile communication device may be provided in the form of a report to a prospective buyer for the buyer to review such information. For example, the report may be printed out by a retailer and provided to the prospective buyer. Alternatively, the report may be provided electronically to a prospective buyer to be viewed on a display of a device. As another alternative, when a resold mobile communication device is first turned on, the user may be provided with an option to select to see the report on a display of the mobile communication device.

The mobile device certification framework may also provide a feature to execute a remote unlock of the mobile communication device based on one or more of the mobile device events associated with the mobile communication device. For example, the certification application may receive an unlock request after resale of the mobile communication device, identify device ownership based on the one or more accessed mobile device events, and send an unlock command to the mobile communication device to unlock the mobile communication device.

The remote unlock feature may also be implemented in an auction setting. For instance, when a plurality of mobile communication devices are auctioned and the buyer receives the shipment, the buyer may be able to unlock the plurality of mobile communication devices by sending an unlock request to the certification application such as by scanning a quick response (QR) code. In response to the unlock request, the certification application may access one or more of the mobile device events associated with each of the plurality of mobile communication devices from the data store to identify device ownership and send an unlock command to the plurality of mobile communication devices to unlock the plurality of mobile communication devices based on the one or more accessed mobile device events associated with each of the plurality of mobile communication devices.

The mobile device certification framework may also enable tracking and prevention of fraudulent reuse of a device identifier (e.g., an Electronic Serial Number (ESN), a Mobile Equipment Identifier (MEID), or an International Mobile Station Equipment Identity (IMEI)) once the mobile communication device has been recycled or retired. For example, the certification application may receive a device recycle event for the mobile communication device and store the device recycle event in the data store as associated with the mobile communication device. The device recycle event may be associated with a unique device identifier of the mobile communication device. After storing the device recycle event, the certification application may receive device side events associated with the mobile communication device from the device client and network side events associated with the mobile communication device from a network client where at least one of the device side events or the network side events comprises the unique device identifier. The certification application may search the data store for the unique identifier to determine whether the unique device identifier is associated with any device recycle events. If the certification application determines that the unique device identifier is associated with a device recycle event based on the searching, such a determination may indicate a fraudulent use of the unique device identifier since the mobile communication device is supposed to be recycled or retired. Based on determining that the unique device identifier is associated with a device recycle event, the certification application may send a lock command to the mobile communication device to lock the mobile communication device, thereby preventing fraudulent use of the mobile communication device.

Turning now to FIG. 1, a mobile communication device certification system 100 is described. In an embodiment, the system 100 comprises a mobile communication device 102 having a processor 104 and a memory 106. The memory 106 may store a device client 108. The device client 108 may be stored in a non-transitory region of the memory 106. In some embodiments, the device client 108 is stored in a protected area of memory such that the device client 108 is not deleted as a result of a full reset. In an embodiment, the device client 108 is stored in a system memory partition and the operating system on the mobile communication device 102 restricts access to the system memory partition, thereby preventing users from circumventing the device client 108.

The mobile communication device 102 also comprises a cellular radio transceiver 110 that may be able to establish a wireless communication link to a cell site 114 which communicatively links the mobile communication device 102 to a network 116. The mobile communication device 102 may further comprise a WiFi radio transceiver 112 that may establish a wireless communication link to a WiFi access point (AP) 118 which communicatively links the mobile communication device 102 to the network 116.

The mobile communication device 102 may be a mobile phone, a smart phone, a personal digital assistant (PDA), a media player, a wearable computer, a headset computer, a laptop computer, a notebook computer, or a tablet computer. The cell site 114 may be an enhanced Node B (eNB), a base transceiver station (BTS), a picocell, or other cellular radio access network (RAN) access point. The cell site 114 may provide a cellular wireless communication link to the mobile communication device 102 according to at least one of a long-term evolution (LTE), a code division multiple access (CDMA), a global system for mobile communications (GSM), or a worldwide interoperability for microwave access (WiMAX) cellular telecommunication protocol. The mobile communication device certification system 100 may comprise any number of mobile communication devices 102, any number of cell sites 114, and any number of WiFi APs 118.

The mobile communication device certification system 100 may also comprise a telecommunication service provider server 120, which may be implemented as a computer system. Computer systems are described further hereinafter. The telecommunications service provider server 120 may comprise a network client 122 stored in a non-transitory region of a memory of the telecommunications service provider server 120 and executed by a processor of the telecommunications service provider server 120. The network client 122 may be located at the cell site 114 or at other locations within the telecommunication service provider's network. The mobile communication device certification system 100 may comprise any number of telecommunications service provider servers 120 and network clients 122.

The mobile communication device certification system 100 may also comprise a certification server 124, which may be implemented as a computer system. As mentioned above, computer systems are described further hereinafter. The certification server 124 may comprises a certification application 126 stored in a non-transitory region of a memory of the certification server 124 and executed by a processor of the certification server 124. While illustrated in FIG. 1 as two independent servers, in an embodiment, the certification application 126 and the network client 122 may be stored and executed on a single server.

The mobile communication device certification system 100 may further comprise a data store 128. The certification server 124 may be communicatively coupled via the network 116 to the data store 128. The network 116 comprises one or more private networks, one or more public networks, or a combination thereof. The network 116 promotes communication as desired among the mobile communication device 102, the telecommunications service provider server 120, the certification server 124, and the data store 128 and communication of the mobile communication device 102 to other mobile communication devices and host computers (not shown).

In an embodiment, the device client 108 implements instructions to detect and provide information to the certification application 126 throughout the lifetime of the mobile communication device 102. For example, the device client 108 may detect device side events associated with the mobile communication device 102 and transmit the device side events to the certification application 126. The device side events may comprise one or more of a power on event, a reset event, an activation event, a device component change event, a repair event, a device identifier change event, or another type of device side event. A power on event may indicate that the mobile communication device 102 has been powered on. A reset event may indicate that the mobile communication device 102 has been reset. An activation event may indicate that the mobile communication device 102 has been activated. A repair event may indicate that the mobile communication device 102 has been repaired. In some circumstances, the repair event may also indicate whether the repair was performed by an authorized party.

A device component change event may indicate that a component of the mobile communication device 102 has been changed. For example, the device client 108 may detect that a serial number of a component has changed and transmit a device component change event comprising the changed serial number of the component to the certification application 126. A device identifier change event may indicate that an identifier of the mobile communication device 102 has been changed. For example, the device client 108 may detect that a phone number of the mobile communication device 102 has changed and transmit a device identifier change event comprising the changed phone number to the certification application 126. Other device side events may be detected and transmitted to the certification application 126 throughout the lifetime of the mobile communication device 102 without departing from the spirit or scope of the present disclosure.

The device side events may be detected and collected by the device client 108 regardless of whether the mobile communication device 102 is connected to the cell site 114. For instance, the device side events can be detected and collected by the device client 108 even if the mobile communication device 102 is only connected to the WiFi AP 118. In an embodiment, the device side events continue to be detected and transmitted by the device client 108 even after the mobile communication device 102 changes to a different carrier network.

The device side events may be detected, collected, and transmitted by the device client 108 at a predefined time or after a predetermined number of events has been detected. Alternatively, the device side events may be detected and transmitted individually by the device client 108 after each event is detected. In an embodiment, for security reasons, the device client 108 encrypts the device side events and transmits the encrypted device side events to the certification application 126.

In addition to detecting and transmitting device side events, the device client 108 may monitor performance of the mobile communication device 102 and transmit mobile device performance information to the certification application 126. For example, the device client 108 may monitor a battery charge/discharge condition and send such information to the certification application 126. The battery charge/discharge condition may indicate whether the battery is in good condition. As another example, the device client 108 may monitor CPU usage and send such information to the certification application 126. Other diagnostic or performance information may be monitored and transmitted by the device client 108 to the certification application 126 without departing from the spirit or scope of the present disclosure.

The device client 108 may also determine and transmit mobile device capabilities of the mobile communication device 102 to the certification application 126. For example, the device client 108 may determine one or more of processor capabilities of the mobile communication device 102, storage capabilities of the mobile communication device 102, applications supported by the mobile communication device 102, display capabilities of the mobile communication device 102, network access and/or frequency bands supported by the mobile communication device 102 or other mobile device capability information and transmit such information to the certification application 126. In some embodiments, in addition to encrypting the device side events, the device client 108 encrypts the mobile device performance information and/or the mobile device capabilities and transmits the encrypted information to the certification application 126.

The instructions implemented by the device client 108 may be received or downloaded such as from the certification server 124. The instructions implemented by the device client 108 may specify a plurality of pathways to transmit the device side events, the mobile device performance information, and/or the device capabilities to the certification server 124. For example, the device client 108 may implement a hierarchical approach to transmitting data to the certification server 124 such that a first pathway is tried initially, then a next pathway is tried if the first pathway is not available, and so forth and so on until the data is successfully transmitted to the certification server 124. In another example, the device client 108 may provide a different pathway to transmit data to the certification server 124 for each of a plurality of different network operators such that the device side events, the mobile device performance information, and/or the device capabilities can continue to be transmitted to the certification server 124 even after the mobile communication device 102 changes to a different carrier network operated by a different network operator.

In an embodiment, the network client 122 implements instructions to detect and provide information associated with the mobile communication device 102 to the certification application 126. For example, the network client 122 may detect network side events associated with the mobile communication device 102 and transmit the network side events to the certification application 126. The network side events may comprise one or more of a provisioning event, a carrier unlock event, a carrier lock event, a lost or stolen event, a device found event, a device return event, a device refurbished event, a device recycled event, or another type of network side event. A provisioning event may indicate that the mobile communication device 102 has been provisioned on the network 116. The provisioning event may identify the time the mobile communication device 102 entered into service and identify the network 116. The provisioning event may also include information about the arrangement made with the network operator such as whether the mobile communication device 102 is leased or owned outright. If the mobile communication device 102 is leased, the provisioning event may include details about the lease such as the end of the lease term.

A carrier unlock event may indicate that the mobile communication device 102 has been unlocked and can operate without carrier imposed restrictions. In some circumstances, a carrier unlock event may happen as a result of a financial obligation associated with the mobile communication device 102 being met. The carrier lock event may indicate that the mobile communication device 102 has been locked by the carrier, thereby restricting use of the mobile communication device 102. In some circumstances, a carrier lock event may happen as a result of a financial obligation associated with the mobile communication device 102 not being met or the mobile communication device 102 being resold.

A lost or stolen event may indicate that the mobile communication device 102 has been lost or stolen. A device found event may indicate that the mobile communication device 102 has been found. A device return event may indicate that the mobile communication device 102 has been returned to the telecommunications service provider. A device refurbished event may indicate that the mobile communication device 102 has been refurbished. A device recycled event may indicate that the mobile communication device 102 has been recycled or retired and is no longer to be used on the network 116. Other network side events may be detected and transmitted to the certification application 126 throughout the lifetime of the mobile communication device 102 without departing from the spirit or scope of the present disclosure. Tracking of events such as the carrier lock and unlock events as well as other network side and/or device side events may enable the tracking of transferal of ownership of the mobile communication device 102 over time.

The instructions implemented by the network client 122 may be received or downloaded such as from the certification server 124. As mentioned above, there may be any number of telecommunications service provider servers 120 and network clients 122 within the mobile communication device certification system 100. In some embodiments, some of the telecommunications service provider servers 120 and network clients 122 may be operated by different network operators such that network side events can be transmitted to the certification server 124 even after the mobile communication device 102 changes to a different carrier network operated by a different network operator.

In an embodiment, the certification application 126 implements instructions to certify the mobile communication device 102. For example, the certification application 126 may receive the device side events from the device client 108 and the network side events from the network client 122 and analyze the device side events and the network side events. In an embodiment, if the device client 108 encrypts the device side events, the certification application 126 decrypts the device side events after receipt and prior to analysis.

The certification application 126 may corroborate one or more of the device side events received from the device client 108 based on one or more of the network side events received from the network client 122. Corroborating one or more device side events based on one or more of the network side events may reduce the chances of fraud on the part of the device client 108.

The certification application 126 may determine mobile device events for the mobile communication device 102 based on the analysis and the corroboration. Some of the mobile device events may be identical or substantially similar to the received device side and/or network side events. Some of the mobile device events may be determined based on inferences from the received device side and/or network side events. For example, one of the mobile device events determined may be a change in carrier network event, and the certification application 126 may determine the change in carrier network event based on network parameters associated with one or more of the device side events received from the device client 108. In an embodiment, when the certification application 126 determines a change in carrier network event, the certification application 126 queries the device client 108 for confirmation of the change in the carrier network event. The certification application 126 may store the mobile device events as associated with the mobile communication device 102 in the data store 128.

In addition to storing the mobile device events, the certification application 126 may receive the mobile device capabilities of the mobile communication device 102 determined by the device client 108 and store the mobile device capabilities as associated with the mobile communication device 102 in the data store 128. The certification application 126 may additionally or alternatively receive the mobile device performance information associated with the mobile communication device 102 from the device client 108 and store the mobile device performance information as associated with the mobile communication device 102 in the data store 128. In an embodiment, if the device client 108 encrypts the mobile device capabilities and/or the mobile device performance information, the certification application 126 decrypts the mobile device capabilities and/or the mobile device performance information after receipt.

In an embodiment, the certification server 124 and the certification application 126 are independent from the network operators. The certification server 124 may offer an application programming interface (API) for various authorized entities to send events for association with the mobile communication device 102 and storage in the data store 128. For example, an original equipment manufacturer (OEM) may provide an event via an API to the certification application 126 in response to generation of a sales manifest. The event from the OEM may identify the mobile communication device 102 by mobile equipment identifier (MEID), equipment serial number, or another identifier. The event may also include a subscriber identity module (SIM) identity. The certification application 126 may store the event from the OEM as associated with the mobile communication device 102 in the data store 128.

The certification application 126 may receive a report request from the mobile communication device 102 or another device. For example, a potential purchaser of the previously owned mobile communication device 102 may request a report regarding the mobile communication device 102 and may use such a report to aid in their purchasing decision. The certification application 126 may generate a report in response to the report request and transmit the report to the mobile communication device 102 or to another device. The mobile communication device 102 or the other device that sent the report request may display the report on a display of the mobile communication device 102 or the other device. Alternatively, the report may be printed and provided to the potential purchaser. In an embodiment, the report comprises the mobile device events. The report may also comprise the mobile device performance information and/or the mobile device capabilities.

In some embodiments, the certification application 126 determines a score for the mobile communication device 102 based on at least some of the mobile device events. The score may also be based on mobile device performance information received from the device client 108. As one non-limiting example, a mobile communication device that has mobile device events indicating that repairs have been performed by authorized parties and mobile device performance information indicating less usage, more efficient CPU utilization, and/or better battery charge/discharge condition may receive a higher score than a mobile communication device that has had repair events performed by unauthorized parties and mobile device performance information indicating more usage, less efficient CPU utilization, and/or worse battery charge/discharge condition. As another non-limiting example, a mobile communication device that has mobile device events indicating that the mobile device has been lost or stolen with multiple lock and unlock events may receive a lower score that a mobile communication device with no lost or stolen event and less lock and unlock events. The report generated may comprise the determined score.

In an embodiment, the certification application 126 receives an unlock request after resale of the mobile communication device 102. The unlock request may comprise a code. For example, the unlock request may comprise a quick response (QR) code or a typed in code. In response to the unlock request, the certification application 126 may access one or more of the mobile device events associated with the mobile communication device 102 from the data store 128. For instance, the certification application 126 may access one or more of the mobile device events associated with the mobile communication device 102 from the data store 128 based on the code received in the unlock request. In an embodiment, the certification application 126 validates the code in the unlock request prior to accessing the mobile device events from the data store 128. The certification application 126 may send an unlock command to the mobile communication device 102 to unlock the mobile communication device 102 based on the one or more accessed mobile device events associated with the mobile communication device 102. The mobile communication device 102 may be unlocked based on the unlock command, thereby enabling the mobile communication device 102 to be operated on a different carrier network.

In an embodiment, the certification application 126 provides the remote device unlock feature discussed above for a plurality of mobile communication devices in an auction setting. For example, when a plurality of mobile communication devices are auctioned and the buyer receives the shipment, the buyer may be able to unlock the plurality of mobile communication devices by sending an unlock request to the certification application 126 such as by scanning a QR code. In response to the unlock request, the certification application 126 may access one or more of the mobile device events associated with each of the plurality of mobile communication devices from the data store 128. The certification application 126 may send an unlock command to the plurality of mobile communication devices to unlock the plurality of mobile communication devices based on the one or more accessed mobile device events associated with each of the plurality of mobile communication devices.

The mobile device certification system 100 may also enable tracking and prevention of fraudulent reuse of a device identifier (e.g., an Electronic Serial Number (ESN), a Mobile Equipment Identifier (MEID), or an International Mobile Station Equipment Identity (IMEI)) once the mobile communication device 102 has been recycled or retired. For example, the certification application 126 may receive a device recycle event for the mobile communication device 102 and store the device recycle event in the data store 128 as associated with the mobile communication device 102. The device recycle event may be associated with a unique device identifier of the mobile communication device. For instance, the device recycle event may be associated with an ESN, a MEID, an IMEI, or another unique device identifier.

In an embodiment, after storing the device recycle event, the certification application 126 may receive device side events associated with the mobile communication device 102 from the device client 108 and network side events associated with the mobile communication device 102 from a network client (e.g., the network client 122 or a different network client) where at least one of the device side events or the network side events comprises the unique device identifier. The certification application 126 may search the data store 128 for the unique identifier to determine whether the unique device identifier is associated with any device recycle events. If the certification application 126 determines that the unique device identifier is associated with a device recycle event based on the searching, such a determination may indicate a fraudulent use of the unique device identifier since the mobile communication device 102 is supposed to be recycled or retired. Based on determining that the unique device identifier is associated with a device recycle event, the certification application 126 may send a lock command to the mobile communication device 102 to lock the mobile communication device 102. The mobile communication device 102 may be locked based on the lock command, thereby preventing fraudulent use of the mobile communication device 102.

Figure 2A:
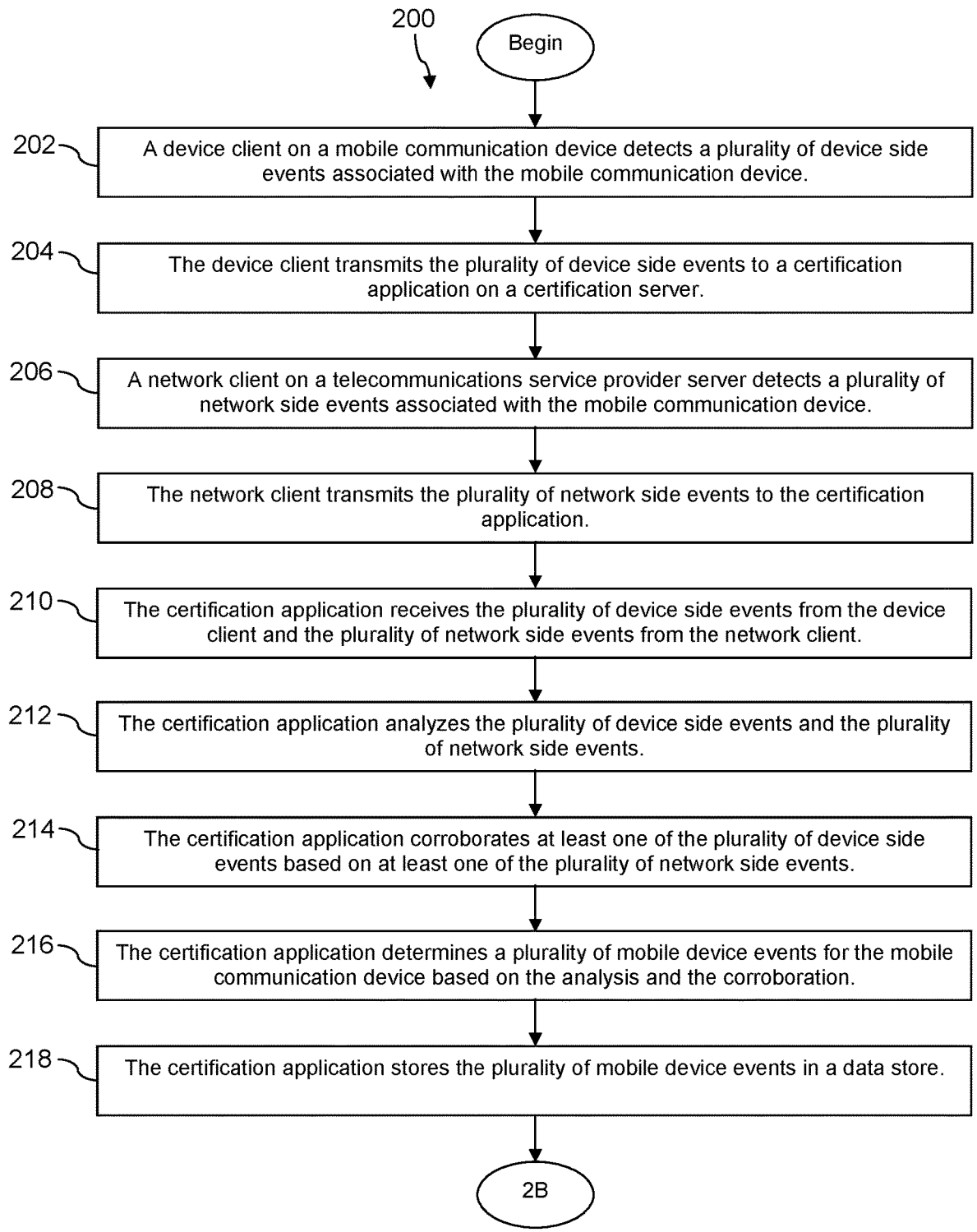
FIGS. 2A and 2B is a flow chart of a method according to an embodiment of the disclosure.
Figure 2B:
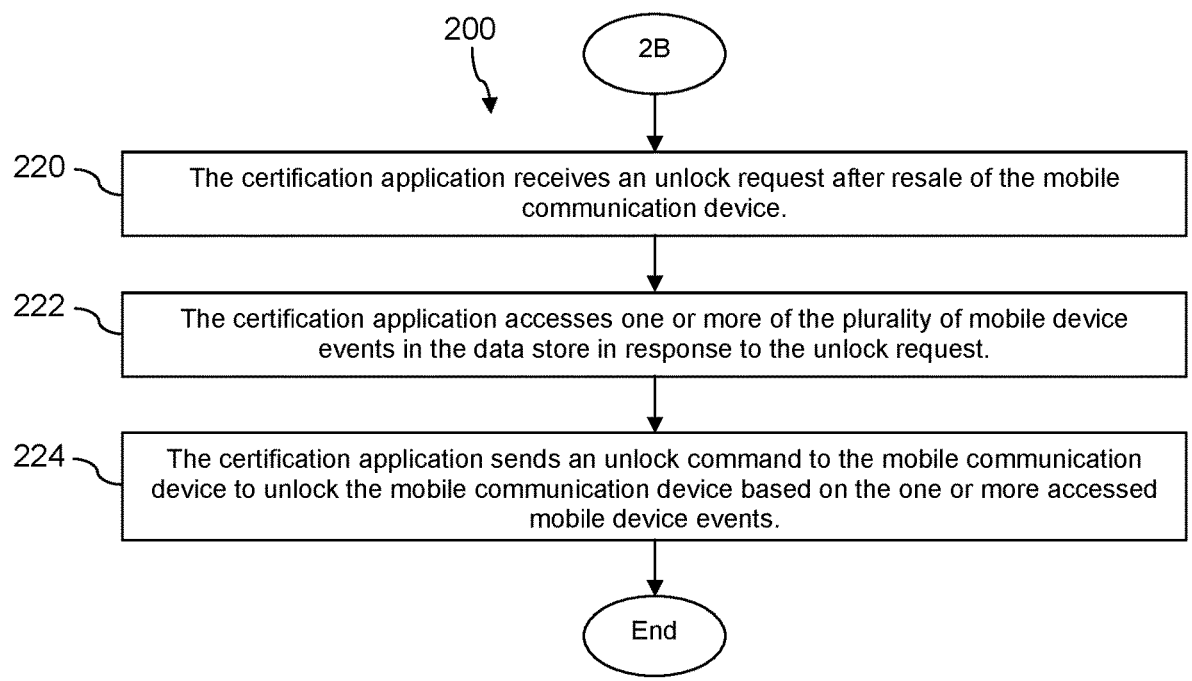

Turning now to FIGS. 2A and 2B, a method 200 is described. At block 202, a device client on a mobile communication device (e.g., device client 108 on mobile communication device 102) detects a plurality of device side events associated with the mobile communication device. At block 204, the device client transmits the plurality of device side events to a certification application on a certification server (e.g., certification application 126 on certification server 124). At block 206, a network client on a telecommunications service provider server (e.g., network client 122 on telecommunications service provider server 120) detects a plurality of network side events associated with the mobile communication device. A block 208, the network client transmits the plurality of network side events to the certification application.

At block 210, the certification application receives the plurality of device side events from the device client and the plurality of network side events from the network client. At block 212, the certification application analyzes the plurality of device side events and the plurality of network side events. At block 214, the certification application corroborates at least one of the plurality of device side events based on at least one of the plurality of network side events. At block 216, the certification application determines a plurality of mobile device events for the mobile communication device based on the analysis and the corroboration. At block 218, the certification application stores the plurality of mobile device events in a data store (e.g., data store 128).

At block 220, the certification application receives an unlock request after resale of the mobile communication device. At block 222, the certification application accesses one or more of the plurality of mobile device events in the data store in response to the unlock request. At block 224, the certification application sends an unlock command to the mobile communication device to unlock the mobile communication device based on the one or more accessed mobile device events.

Figure 3A:
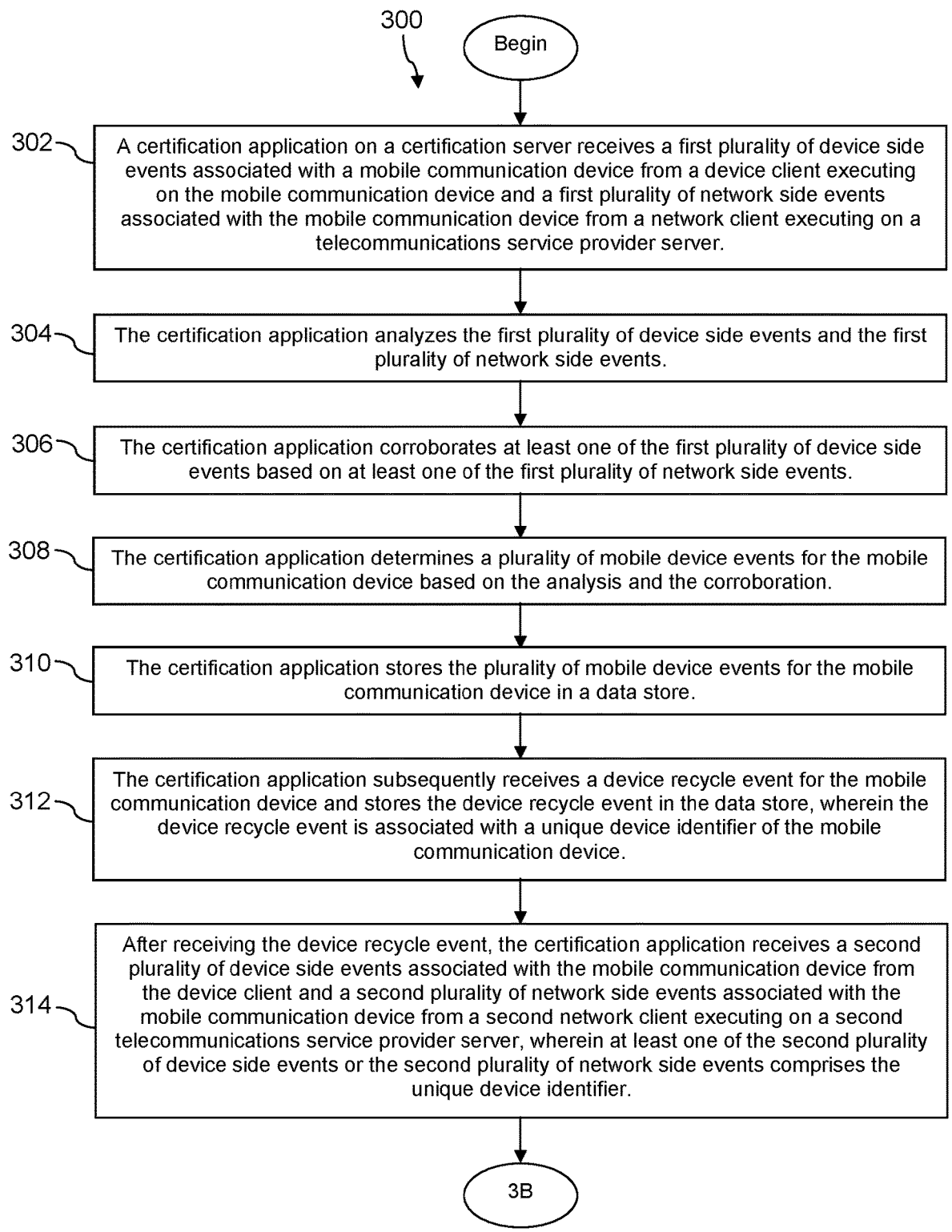
FIGS. 3A and 3B is a flow chart of another method according to an embodiment of the disclosure.
Figure 3B:
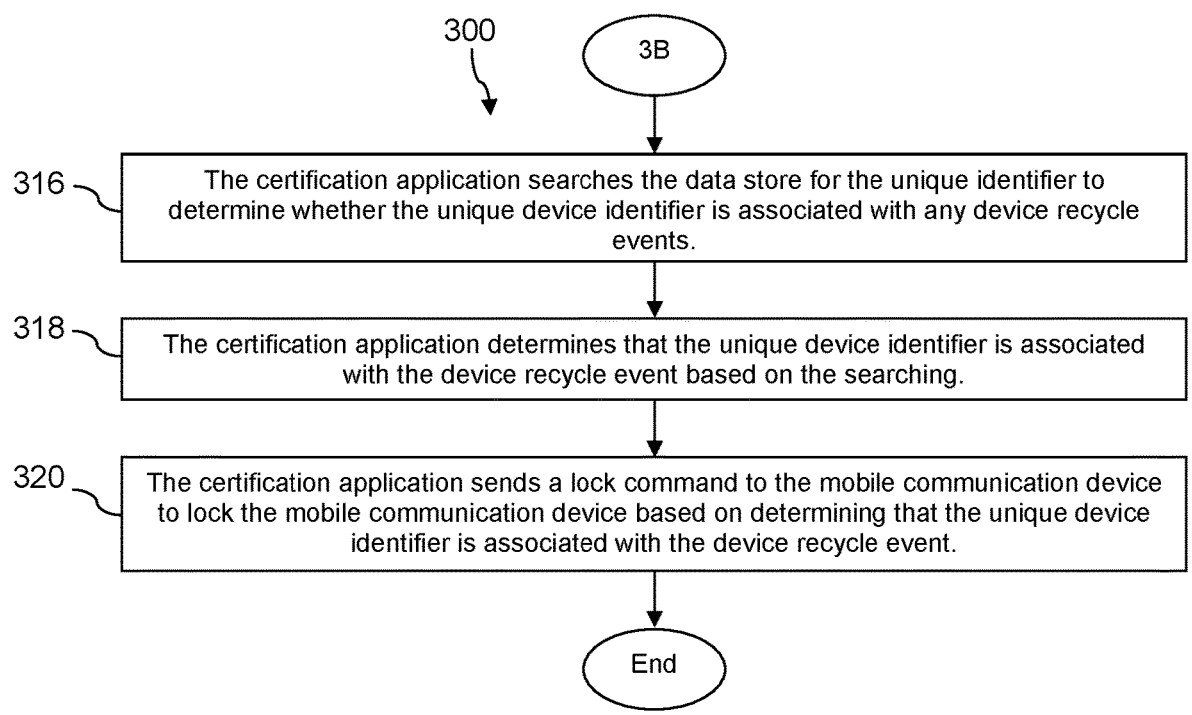

Turning now to FIGS. 3A and 3B, a method 300 is described. At block 302, a certification application on a certification server (e.g., certification application 126 on certification server 124) receives a first plurality of device side events associated with a mobile communication device from a device client executing on the mobile communication device (e.g., device client 108 on mobile communication device 102) and a first plurality of network side events associated with the mobile communication device from a network client executing on a telecommunications service provider server (e.g., network client 122 on telecommunications service provider server 120). At block 304, the certification application analyzes the first plurality of device side events and the first plurality of network side events. At block 306, the certification application corroborates at least one of the first plurality of device side events based on at least one of the first plurality of network side events. At block 308, the certification application determines a plurality of mobile device events for the mobile communication device based on the analysis and the corroboration. At block 310, the certification application stores the plurality of mobile device events for the mobile communication device in a data store (e.g., data store 128).

At block 312, the certification application subsequently receives a device recycle event for the mobile communication device and stores the device recycle event in the data store. The device recycle event may be associated with a unique device identifier of the mobile communication device. At block 314, after receiving the device recycle event, the certification application receives a second plurality of device side events associated with the mobile communication device from the device client and a second plurality of network side events associated with the mobile communication device from a second network client executing on a second telecommunications service provider server. At least one of the second plurality of device side events or the second plurality of network side events may comprise the unique device identifier.

At block 316, the certification application searches the data store for the unique identifier to determine whether the unique device identifier is associated with any device recycle events. At block 318, the certification application determines that the unique device identifier is associated with the device recycle event based on the searching. At block 320, the certification application sends a lock command to the mobile communication device to lock the mobile communication device based on determining that the unique device identifier is associated with the device recycle event.

Figure 4:
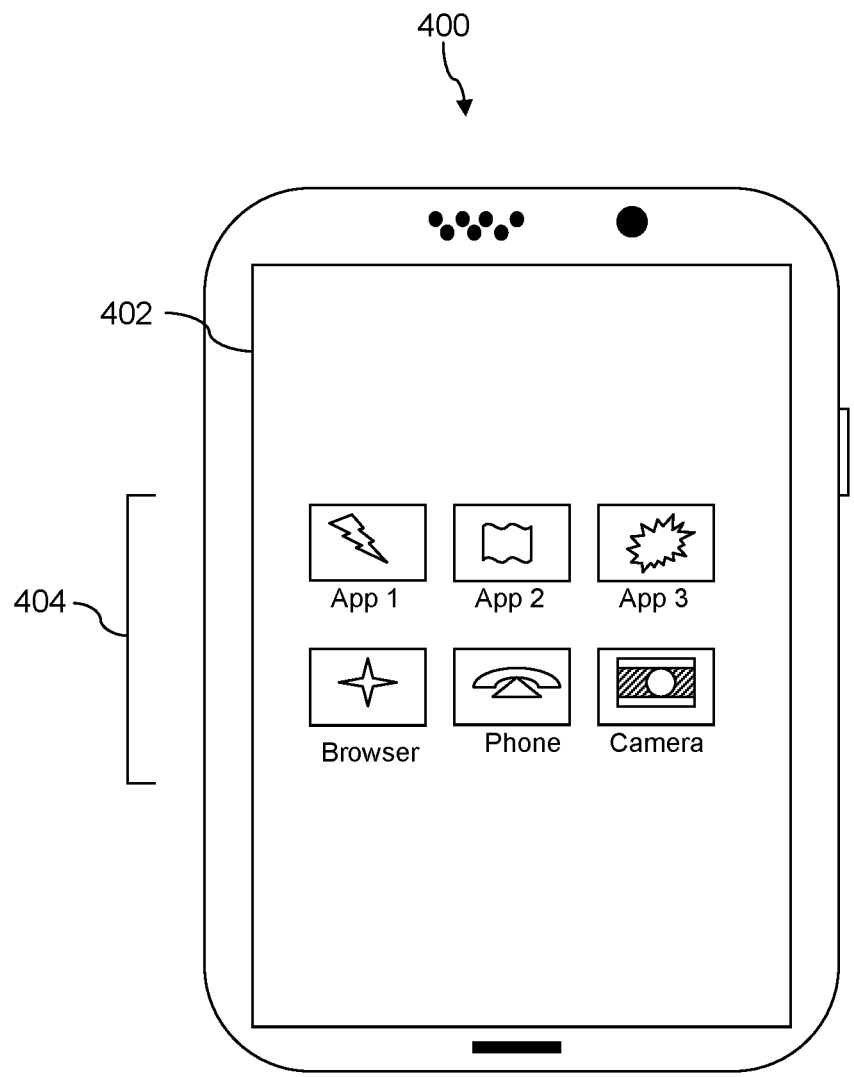
FIG. 4 is an illustration of a mobile communication device according to an embodiment of the disclosure.

FIG. 4 depicts the user equipment (UE) 400, which is operable for implementing aspects of the present disclosure such as the mobile communication device 102, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
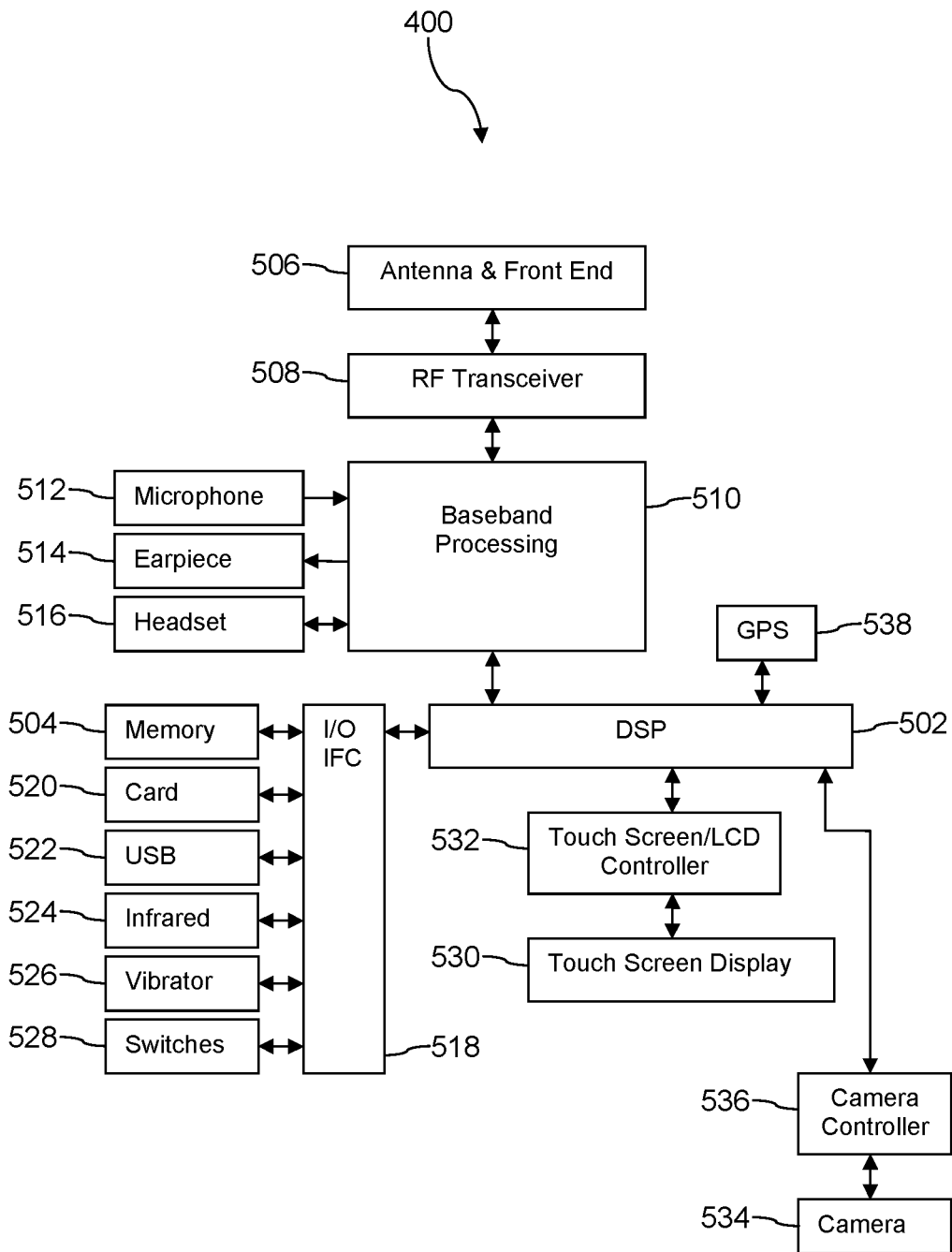
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
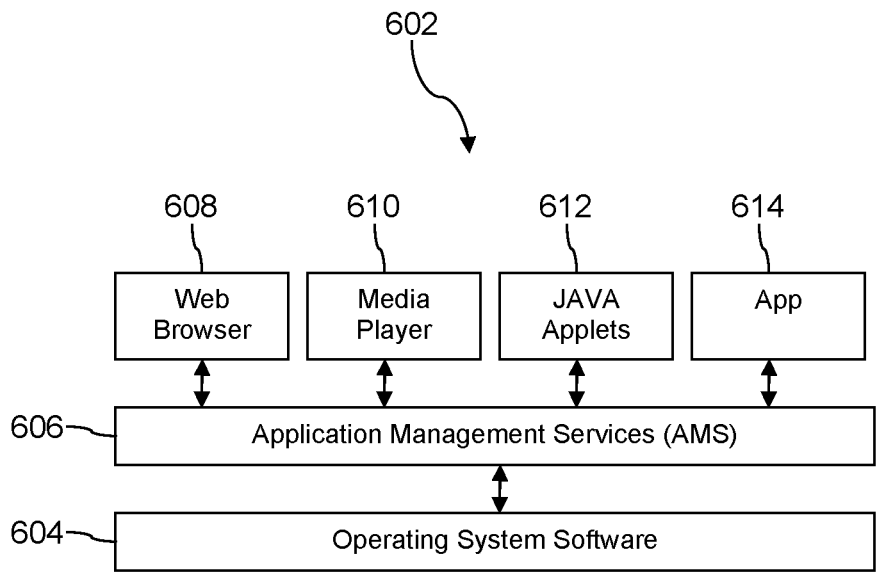
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
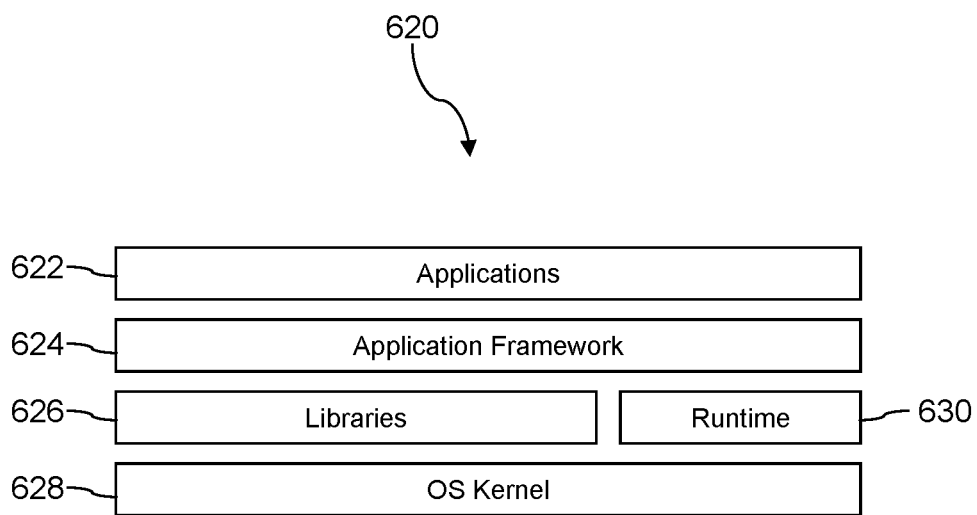
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
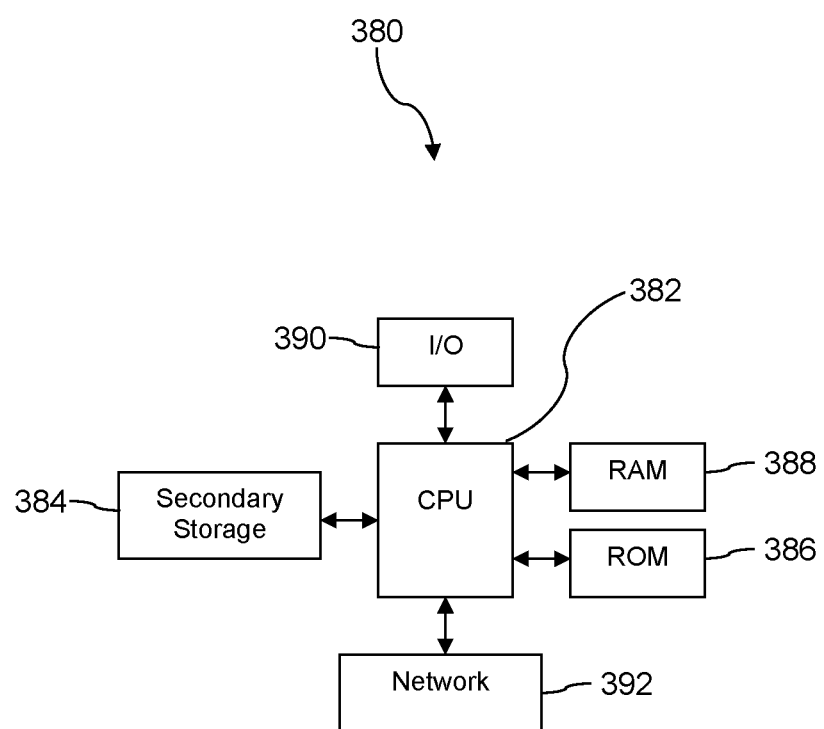
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers.

In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device certification system, comprising:
   a mobile communication device that comprises:
      a device client stored in a non-transitory memory of the mobile communication device, that when executed by a processor of the mobile communication:
         detects a plurality of device side events associated with the mobile communication device;
         transmits the plurality of device side events to a certification application;
   one or more servers that comprise:
      a network client stored in a non-transitory memory of one of the one or more servers, that when executed by a processor of one of the one or more servers:
         detects a plurality of network side events associated with the mobile communication device; and
         transmits the plurality of network side events to the certification application; and
      the certification application stored in a non-transitory memory of one of the one or more servers, that when executed by a processor of one of the one or more servers:
         receives the plurality of device side events from the device client and the plurality of network side events from the network client;
         analyzes the plurality of device side events and the plurality of network side events;
         corroborates at least one of the plurality of device side events based on at least one of the plurality of network side events;
         determines a plurality of mobile device events for the mobile communication device based on the analysis and the corroboration;
         stores the plurality of mobile device events in a data store;
         receives an unlock request after resale of the mobile communication device;
         accesses one or more of the plurality of mobile device events in the data store in response to the unlock request; and
         sends an unlock command to the mobile communication device to unlock the mobile communication device based on the one or more accessed mobile device events.

2. The mobile communication device certification system of claim 1, wherein the one or more servers comprise a telecommunications service provider server, and wherein the network client is stored in a non-transitory memory of telecommunication service provider server and executed by a processor of the telecommunication service provider server.

3. The mobile communication device certification system of claim 1, wherein the one or more servers comprises a certification server, and wherein the certification application is stored in a non-transitory memory of the certification server and executed by a processor of the certification server.

4. The mobile communication device certification system of claim 1, wherein the device client determines mobile device capabilities and transmits the mobile device capabilities to the certification application, and wherein the certification application receives the mobile device capabilities from the device client and stores the mobile device capabilities in the data store.

5. The mobile communication device certification system of claim 1, wherein the device client monitors mobile device performance and transmits mobile device performance information to the certification application based on the monitoring of the mobile device performance, and wherein the certification application receives the mobile device performance information from the device client and stores the mobile device performance information in the data store.

6. The mobile communication device certification system of claim 5, wherein the certification application receives a report request, generates a report in response to the report request, and transmits the report, wherein the report comprises the plurality of mobile device events and the mobile device performance information.

7. The mobile communication device certification system of claim 1, wherein one of the plurality of mobile device events determined is a change in carrier network event, and wherein the certification application determines the change in carrier network event based on network parameters associated with one or more of the received plurality of device side events.

8. The mobile communication device certification system of claim 7, wherein the certification application queries the device client for confirmation of the change in the carrier network event.

9. The mobile communication device certification system of claim 1, wherein the non-transitory memory of the mobile communication device storing the device client is a protected non-transitory memory such that the device client is not deleted when a full reset occurs.

10. A method for certifying one or more mobile communication devices, comprising:
    detecting, by a device client stored on a non-transitory memory of a mobile communication device and executed by a processor of the mobile communication device, a plurality of device side events associated with the mobile communication device;
    transmitting, by the device client, the plurality of device side events to a certification application stored in a non-transitory memory of a certification server and executed by a processor of the certification server;
    detecting, by a network client stored on a non-transitory memory of a telecommunications service provider server and executed by a processor of the telecommunications service provider server, a plurality of network side events associated with the mobile communication device;

transmitting, by the network client, the plurality of network side events to the certification application;

receiving, by the certification application, the plurality of device side events from the device client and the plurality of network side events from the network client;

analyzing, by the certification application, the plurality of device side events and the plurality of network side events;

corroborating, by the certification application, at least one of the plurality of device side events based on at least one of the plurality of network side events;

determining, by the certification application, a plurality of mobile device events for the mobile communication device based on the analysis and the corroboration;

storing, by the certification application, the plurality of mobile device events in a data store;

receiving, by the certification application, an unlock request after resale of the mobile communication device;

accessing, by the certification application, one or more of the plurality of mobile device events in the data store in response to the unlock request; and sending, by the certification application, an unlock command to the mobile communication device to unlock the mobile communication device based on the one or more accessed mobile device events.

11. The method of claim 10, wherein the unlock request comprises a code, and the method further comprising validating, by the certification application, the code before accessing the one or more of the plurality of mobile device events.

12. The method of claim 10, wherein the plurality of device side events comprises a plurality of: a power on event, a reset event, an activation event, a device component change event, a repair event, or a device identifier change event.

13. The method of claim 10, wherein the plurality of network side events comprises a plurality of: a provisioning event, a carrier unlock event, a carrier lock event, a lost or stolen event, a device found event, a device return event, a device refurbished event, or a device recycled event.

14. The method of claim 10, further comprising:
encrypting, by the device client, the plurality of device side events prior to transmission; and
decrypting, by the certification application, the plurality of device side events after receipt.

15. The method of claim 10, further comprising:
determining, by the certification application, a score for the mobile communication device based on at least some of the plurality of mobile device events and mobile device performance information received from the device client;
receiving, by the certification application, a report request;
generating and transmitting, by the certification application, a report, wherein the report comprises the plurality of mobile device events and the determined score.

16. The method of claim 10, further comprising:
receiving an event from an original equipment manufacturer in response to generation of a sales manifest; and
storing the event in the data store.

17. The method of claim 10, wherein the device client continues to detect and transmit device events even after the mobile communication device changes to a different carrier network.

18. A method for certifying one or more mobile communication devices, each step in the method performed by a certification application stored in a non-transitory memory of a certification server and executed by a processor of the certification server, the method comprising:

receiving a first plurality of device side events associated with a mobile communication device from a device client executing on the mobile communication device and a first plurality of network side events associated with the mobile communication device from a network client executing on a telecommunications service provider server;

analyzing the first plurality of device side events and the first plurality of network side events;

corroborating at least one of the first plurality of device side events based on at least one of the first plurality of network side events;

determining a plurality of mobile device events for the mobile communication device based on the analysis and the corroboration;

storing the plurality of mobile device events for the mobile communication device in a data store;

subsequently receiving a device recycle event for the mobile communication device and storing the device recycle event in the data store, wherein the device recycle event is associated with a unique device identifier of the mobile communication device;

after storing the device recycle event, receiving a second plurality of device side events associated with the mobile communication device from the device client and a second plurality of network side events associated with the mobile communication device from a second network client executing on a second telecommunications service provider server, wherein at least one of the second plurality of device side events or the second plurality of network side events comprises the unique device identifier;

searching the data store for the unique identifier to determine whether the unique device identifier is associated with any device recycle events;

determining that the unique device identifier is associated with the device recycle event based on the searching; and sending a lock command to the mobile communication device to lock the mobile communication device based on determining that the unique device identifier is associated with the device recycle event.

19. The method of claim 18, wherein the unique device identifier comprises an Electronic Serial Number, a Mobile Equipment Identifier, or an International Mobile Station Equipment Identity.

20. The method of claim 18, wherein the network client and the telecommunications service provider server are different than the second network client and the second telecommunications service provider server.

* * * * *